(12) United States Patent
Sanghvi et al.

(10) Patent No.: US 11,223,643 B2
(45) Date of Patent: Jan. 11, 2022

(54) MANAGING A SEGMENTATION POLICY BASED ON ATTACK PATTERN DETECTION

(71) Applicant: Illumio, Inc., Sunnyvale, CA (US)

(72) Inventors: Rushabh Sanghvi, Milpitas, CA (US); Rupesh Kumar Mishra, Santa Clara, CA (US)

(73) Assignee: Illumio, Inc., Sunnyvale, CA (US)

( * ) Notice: Subject to any disclaimer, the term of this patent is extended or adjusted under 35 U.S.C. 154(b) by 251 days.

(21) Appl. No.: 16/677,488

(22) Filed: Nov. 7, 2019

(65) Prior Publication Data
US 2021/0144159 A1 May 13, 2021

(51) Int. Cl.
*H04L 29/06* (2006.01)
(52) U.S. Cl.
CPC .......... *H04L 63/1425* (2013.01); *H04L 63/20* (2013.01)
(58) Field of Classification Search
CPC ............................ H04L 63/1425; H04L 63/20
See application file for complete search history.

(56) References Cited

U.S. PATENT DOCUMENTS

| 9,660,959 | B2* | 5/2017 | Hsu | ...................... | H04L 63/0254 |
| 10,685,293 | B1* | 6/2020 | Heimann | ............ | H04L 63/1433 |
| 10,897,472 | B1* | 1/2021 | Viglione | ............. | H04L 63/1491 |
| 2016/0359629 | A1* | 12/2016 | Nadathur | .................. | H04L 9/14 |
| 2019/0392155 | A1* | 12/2019 | Eldefrawy | ............. | G06F 17/18 |

OTHER PUBLICATIONS

Luo, Yuxuan, et al. "PU learning in payload-based Web anomaly detection." 2018 Third International Conference on Security of Smart Cities, Industrial Control System and Communications (SSIC). IEEE, 2018. (Year: 2018).*

* cited by examiner

*Primary Examiner* — Joseph P Hirl
*Assistant Examiner* — Ka Shan Choy
(74) *Attorney, Agent, or Firm* — Fenwick & West LLP

(57) ABSTRACT

A policy management server detects attack patterns in traffic flows reported by distributed enforcement modules enforcing the segmentation policy. The policy management server generates a traffic flow graph representing traffic flows between workloads or groups of workloads. Traffic flows matching one or more traffic flow patterns may be tagged in the traffic flow graph. For example, if an attack pattern is present in a connection that is blocked under the segmentation policy, the policy management server may block updates to the segmentation policy that attempt to enable the connection or may alert an administrator prior to enabling the update. If an attack pattern is present in a connection that is allowed under the segmentation policy, the segmentation policy may be updated to block the connection, alert an administrator, redirect traffic to a deception service, or take other remedial action.

20 Claims, 5 Drawing Sheets

MANAGING A SEGMENTATION POLICY BASED ON ATTACK PATTERN DETECTION

BACKGROUND

Technical Field

This application relates generally to application security, and more specifically, to detecting attack patterns in segmented network environment.

Description of Related Art

A segmentation policy comprises a set of rules that control which workloads may communicate on a network and may place restrictions on how such workloads may communicate. To enforce the segmentation policy, distributed firewalls executing on hosts or network midpoint devices receive management instructions for enforcing respective rules of the segmentation policy. The firewalls can filter traffic based on the respective IP addresses and ports of the source and destination, network protocols, and/or or other data to enforce the rules. When configuring a segmentation policy, it is useful to detect traffic patterns indicative of malicious behavior so that the segmentation policy can be appropriately configured to prevent such attacks.

SUMMARY

A system, non-transitory computer-readable storage medium, and method generates a traffic flow graph representing traffic in a segmented network that includes metadata tags indicating traffic flows matching an attack pattern. A policy management server stores a plurality of traffic pattern rules for detecting traffic patterns indicative of malicious behavior. The policy management server receives from a plurality of distributed enforcement modules, traffic flow data associated with a plurality of workloads managed by the plurality of distributed enforcement modules. The traffic flow data includes blocked connection attempts and successful connections. The policy management server processes the traffic flow data to identify a traffic flow between a first workload and a second workload that meets a matching traffic pattern rule of the plurality of traffic pattern rules. The policy management server tags the identified traffic flow as attack traffic.

In an embodiment, the policy management server generates a visual representation of the traffic flow graph that includes a visual indicator for the identified traffic flow corresponding to the attack traffic. The traffic flow graph is provided to an administrator client for display, which may be useful for enabling the administrator to generate or update a segmentation policy that controls the permissible communications of the workloads.

In other embodiments, the policy management server enables the traffic flow graph and associated tags indicating attack traffic to be accessed by an application used for generating a segmentation policy, either based on automated actions, administrator inputs, or both. For example, the application may issue an alert in response to detecting an attempt to enforce a segmentation that enables traffic flows detected to be attack traffic, thereby enhancing network security.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures. It is noted that wherever practicable similar or like reference numbers may be used in the figures and may indicate similar or like functionality.

A policy management server detects attack patterns in traffic flows reported by distributed enforcement modules enforcing the segmentation policy. The policy management server generates a traffic flow graph representing traffic flows between workloads or groups of workloads. Traffic flows matching one or more traffic flow patterns may be tagged in the traffic flow graph. For example, if an attack pattern is present in a connection that is blocked under the segmentation policy, the policy management server may block updates to the segmentation policy that enable the connection or alert an administrator prior to enabling the update. If an attack pattern is present in a connection that is allowed under the segmentation policy, the segmentation policy may be updated to block the connection or an administrator may be alerted to enable the administrator to take a remedial action.

Figure 1:
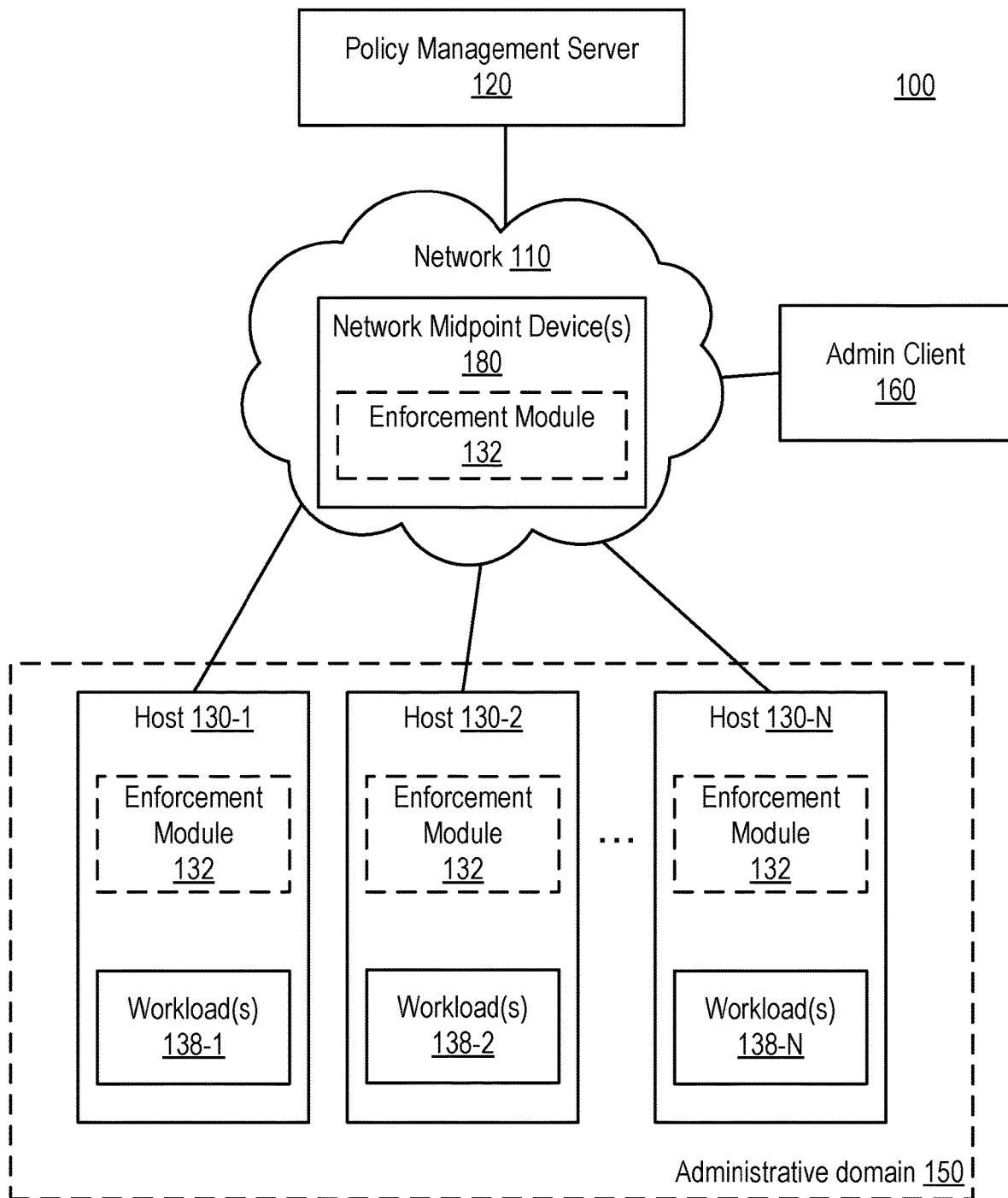
FIG. 1 is a high-level block diagram illustrating an environment for managing a segmentation policy, according to one embodiment.

FIG. 1 is a high-level block diagram illustrating a networked computing environment 100. The networked computing environment 100 includes a policy management server 120, a network 110 including one or more network midpoint devices 180, an administrative client 160, and an administrative domain 150 that includes a plurality of hosts 130 (e.g., hosts 130-1, 130-2, . . . , 130-N). The administrative domain 150 can correspond to a set of devices controlled by an enterprise such as, for example, a service provider, a corporation, a university, or a government agency.

The hosts 130 may each comprise a physical host device, a virtual machine executing on computer system, or an operating system instance executing on a physical host device or virtual machine capable of hosting one or more workloads 138. A single physical or virtual machine may operate a single host 130 or may operate multiple hosts 130. The hosts 130 each execute one or more workloads 138 (e.g., one or more workloads 138-1, one or more workloads 138-2, etc.). The workloads 138 comprise independently addressable computing units for performing computing tasks. For example, each workload 138 may be addressable on the network 110 by a specific network address associated with the host 130 and a port associated with a service provided by the workload 138. A workload 138 may comprise, for example, an application or application component, a process, a container, or other sub-component thereof executing on the host 130. In some instances, a host 130 may operate only a single workload 138. In other instances, a host 130 may operate multiple workloads 138 (e.g., multiple containers) that may be independently addressable and may execute different applications or otherwise perform different independent computing functions. In some embodiments, multiple workloads 138 may operate collectively to execute an application. The workloads 138 on the hosts 130 may communicate with other workloads 138 on different hosts 130 within the administrative domain 150 to perform various tasks.

The network 110 represents the communication pathways between the policy management server 120, the administrative client 160, and the hosts 130. In one embodiment, the network 110 uses standard communications technologies and/or protocols and can include the Internet. In another embodiment, the entities on the network 110 can use custom and/or dedicated data communications technologies. The network 110 includes one or more network midpoint devices 180 that facilitate communications over the network 110. The network midpoint devices 180 may include, for example, routers, switches, access points, firewall devices, or other devices that control communications between the workloads 138 over the network 110.

The policy management server 120 is a computer (or set of computers) that obtains and stores information about the hosts 130 on the network 110, the network midpoint devices 180, and the workloads 138 executing on the hosts 130. The policy management server 120 manages a segmentation policy for the administrative domain 150 that regulates communications between workloads 138 within the administrative domain 150. In an embodiment, the segmentation policy is set forth using permissive rules that specify connections that are permitted. The segmentation policy is enforced by blocking connections that are not expressly permitted by the rules. For example, the segmentation policy includes a set of rules specifying whether certain workloads 138 are allowed to provide services to or receive services from other workloads 138, and may place restrictions on how those workloads 138 are allowed to communicate when providing or consuming the services. For example, a segmentation policy may include a rule specifying that a workload 138-1 operating on a host 130-1 is allowed to provide a particular service to a workload 138-2 operating on a host 130-2. Absent other rules, the workload 138-1 will thus be blocked from providing the service to a workload 138-N operating on a host 130-N. The rule may furthermore specify the type of service that the workload 138-1 is allowed to provide to workload 138-2 (e.g., a database service, a web service, etc.). Additionally, the rule may specify how the workloads 138-1, 138-2 may communicate when providing this service (e.g., using encrypted communication only, using authenticated communication only, etc.). A rule may be specified as a plurality of fields including a "service," a "provided-by" portion that identifies one or more workloads 138 that is permitted to provide the service (which may be specified by a port number), a "used-by" portion that identifies one or more workloads 138 that is permitted to use the service provided by the workloads 138 in the "provided-by portion," and a "rule function" that may place one or more restrictions on the communications between the workloads 138 while facilitating the service.

In an embodiment, the policy management server 120 may assign one or more labels to each workload 138 that define one or more high-level characteristics of the workload 138. Labels may be multi-dimensional. Here, a label may comprise a "dimension" (a high-level characteristic) and a "value" (the value of that high-level characteristic). For example, one possible label dimension may specify a "role" of the workload 138 and may have values such as "web," "API," or "database" specifying the role of the workload 138 within the administrative domain 150. In another example, a label dimension may specify a "location" of the workload 138 and may have values such as "United States" or "Europe." Workloads 138 may also be labeled based on a user group of a user that is logged into the workload 138 or the corresponding host 130 on which the workload 138 executes. For example, a workload 138 may have a label with a dimension "user group" and a value "managers." Each workload 138 may be assigned labels for one or more dimensions but each workload 138 does not necessarily have a label assigned for every possible dimension. For example, a workload 138 may have a label specifying its location but may not necessarily have a label specifying its role. The set of labels assigned to a particular workload 138 may be referred to herein as a label set for the workload 138.

A logical management model specifying the number and types of dimensions available and those dimensions' possible values may be configurable. In one embodiment, the logical management model includes the following dimensions and possible values, as shown in Table 1:

TABLE 1

Example of logical management model

| Dimension | Meaning (M), Values (V) |
|---|---|
| Role | M: The role of the workload within the administrative domain.<br>V: web, API, database |
| Environment | M: The lifecycle stage of the workload.<br>V: production, staging, development |
| Application | M: The logical application (higher-level grouping of managed servers) to which the workload belongs.<br>V: trading, human resources |
| Line of Business | M: The business unit to which the workload belongs.<br>V: marketing, engineering |
| Location | M: The location of the workload. Can be physical (e.g., country or geographical region) or logical (e.g., network). Physical is particularly useful for expressing geographic compliance requirements.<br>V: US or EU (physical), us-west-1 or us-east-2 (logical) |
| User Group | M: The user group containing the user logged onto the workload.<br>V: Engineers, Contractors, Managers, System Administrators |

The policy management server 120 may utilize label sets to enable the segmentation policy to be defined at a high level of abstraction by specifying rules based on label sets. Thus, a rule of the segmentation policy may identify a group of workloads 138 to which a portion of the rule is applicable by referencing one or more label sets. For example, a rule may specify that a first group of workloads 138 with a label set A may provide a service B to a second group of workloads 138 with a label set C. Rules may be specified for groups of workloads 138 identified using only a subset of the label dimensions.

The policy management server 120 may retain a repository storing information about the hosts 130 and the workloads 138 managed by the policy management server 120. For example, the policy management server 120 may store workload identifiers that identify the workloads 138, and membership information indicating one or more groups of workloads 138 to which each workload 138 belong (e.g., as defined by the respective label sets for the workloads 138).

Table 2 illustrates an example of information stored by the policy management server 120. Here, the workload IDs represent the workload identifiers for the workloads 138. The memberships represent groups to which one or more workloads 138 belongs. Each group may correspond to a unique label set involving one or more dimensions.

TABLE 2

Example of a Repository Table

| Workload ID | Memberships |
|---|---|
| ID1 | A, C, D |
| ID2 | B, C |
|  | D |
| . | . |
| . | . |
| . | . |
| IDn | B, D, E, F |

Instead of enforcing the segmentation policy at a centralized device, the segmentation policy is instead enforced in a distributed manner by at least a subset of the hosts 130 and/or the network midpoint devices 180. To enable enforcement of the segmentation policy, the policy management server 120 generates a set of management instructions and distributes the management instructions to enforcement modules 132 that may be executed on the hosts 130 or on the network midpoint devices 180. The management instructions include the rules controlling communications between different groups of workloads 138 (e.g., specified by their label sets or directly by an identifier of the workload 138) and membership information indicating workloads 138 belonging to each group (e.g., which workloads 138 have certain label sets). For efficiency of distribution, the policy management server 120 may send different management instructions to different enforcement modules 132 so that each enforcement module 132 gets only the management instructions relevant to its operation. Here, the policy management server 120 may determine which rules are relevant to a given enforcement module 132 and distribute the relevant rules to that enforcement module 132. A rule may be deemed relevant to an enforcement module 132 on a particular host 130 if that host 130 executes one or more workloads 138 that belongs to a group (defined by one or more label sets) referenced by the rule and the enforcement module 132 on the host 130 is configured to enforce that particular rule. A rule may be deemed relevant to an enforcement module 132 on a particular network midpoint device 180 if that network midpoint device 180 is upstream from a host 130 executing one or more workloads 138 that belongs to a group (defined by one or more label sets) referenced by the rule and the enforcement module 132 on the network midpoint device 180 is configured to enforce that particular rule. The policy management server 120 may furthermore determine which membership information is relevant to each enforcement module 132 and distribute the relevant membership information to each respective enforcement module 132. Here, membership information may be relevant to a particular enforcement module 132 if it defines membership of a group referenced by a rule deemed relevant to the particular enforcement module 132.

In an embodiment, the enforcement modules 132 may store logs of traffic flow data indicating traffic that is blocked by a traffic filter and traffic that is allowed to pass through the traffic filter. The enforcement modules 132 may report respective traffic flow data to the policy management server 120. The policy management server 120 may analyze the traffic flow data to generate a traffic flow graph comprising a representation of connections being allowed and connections being blocked. A visual representation of the traffic flow graph may be generated to enable a network administrator to visualize the permitted and blocked connections. The policy management server 120 may facilitate detection of traffic patterns indicative of malicious behavior and remediation activities in response to a detection. For example, the policy management server 120 may obtain traffic flow data from the enforcement modules 132 and apply traffic pattern detection rules to identify traffic meeting traffic patterns indicative of malicious behavior. The policy management server may tag the attack traffic flow with metadata to indicate connections that appear to be associated with malicious behavior. The traffic flow data together with associated with metadata can be used to generate a visual representation of the traffic flow or otherwise made accessible (e.g., via an API or method call) to enable generating or updating of the segmentation policy. For blocked traffic, identifying the traffic flows associated with attack patterns enables an administrator to distinguish between blocked traffic that appears legitimate and blocked traffic that is malicious. If desired, an administrator could then easily update the segmentation policy to allow the blocked traffic that is legitimate while continuing to block the traffic meeting the traffic pattern detection rules. In the case that allowed traffic meeting the traffic pattern detection rules, the segmentation policy may be updated to block the traffic, either by a manual update facilitated by an administrator or by an automatic update initiated in response to the detection. In an embodiment, the policy management server 120 may take a different remedial action such as quarantining a malicious actor identified as a source of the malicious attack pattern, configuring an external edge firewall to block the malicious actor, or forwarding traffic to a deception service.

The administrative client 160 comprises a computing device that may be operated by an administrator of the administrative domain 150 being managed by the policy management server 120. The administrative client 160 may execute an interface (e.g., via an application or web browser) that enables the administrator to interact with the policy management server 120 to configure or view the segmentation policy. The interface may furthermore enable the administrator to obtain various information about the hosts 130 and workloads 138 on the network 120 and view traffic flows between the workloads 138 as described above.

Figure 2:
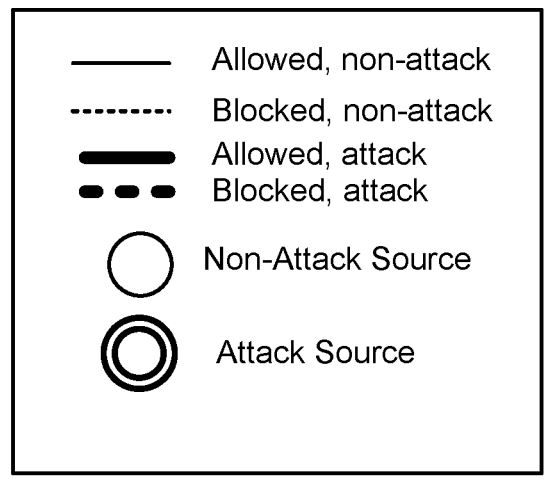
FIG. 2 is an example embodiment of a traffic flow graph including indications of traffic flows matching an attack pattern.
Figure 2:
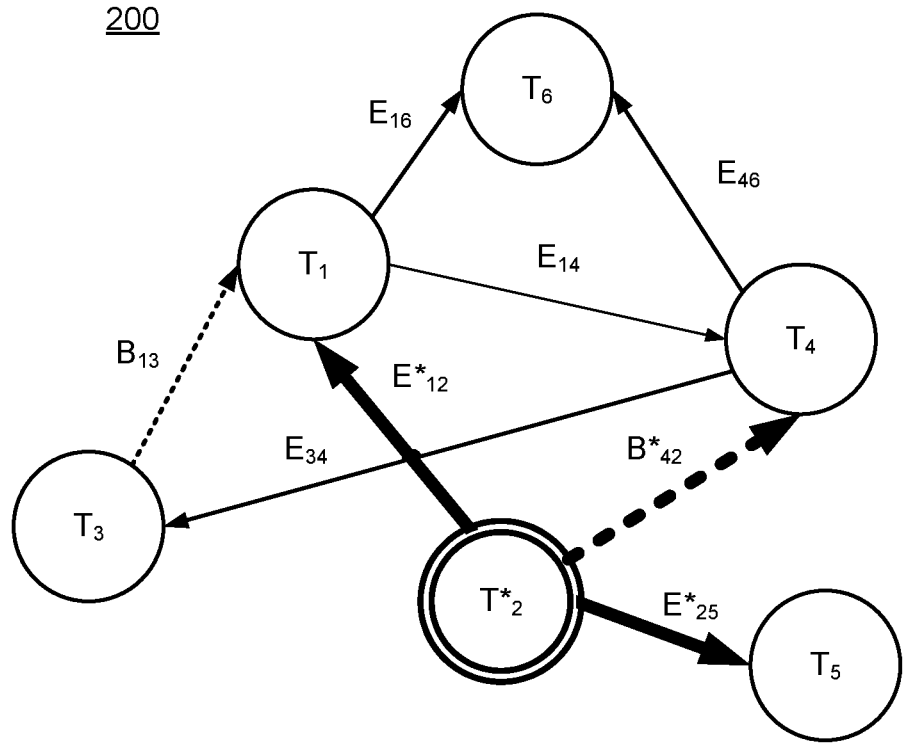

FIG. 2 illustrates an example embodiment of a traffic flow graph 200 representing the traffic flow data. While FIG. 2 illustrates a particular visual representation of the traffic flow graph 200, other representations are possible including other visual representations or non-graphical data structure representations. Here, the traffic flow graph 200 illustrates each workload 138 (or group of workloads 138) as a node T and illustrates successful connections between workloads 138 (or groups of workloads 138) as a line E connecting the respective nodes T. The traffic flow graph 200 may also include lines B representing attempted connections between nodes T that are blocked by the enforcement modules 132. Lines in the traffic flow graph 200 may be directional to indicate a direction of the traffic flow from a source to a destination. Lines representing permitted connections E and blocked connections B may be visually distinguished in the traffic flow graph 200 based on a visual feature such as color, line weight, line style, reference indicator, etc. Furthermore, lines B*, E* representing successful connections or blocked connections with traffic indicative of an attack pattern and an identified source of the attack (node $T^*_2$) may be distinguished in the traffic flow graph by a visual indicator.

The traffic flow graph 200 may be viewed at different granularity levels. For example, at an application level view, workloads 138 belonging to the same application are grouped as a single node T. Connections between a pair of nodes T are represented as lines E between the nodes if any workloads 138 within the respective group are connected (even if no traffic is observed between other workloads 138 in the group). Similarly, blocked connection attempts between a pair of nodes T are represented as lines B between the nodes if any workloads 138 within the respective group have connection attempts blocked by the segmentation policy. At a workload level view, nodes T may instead represent individual workloads 138 and connections or blocked connections between a pair of workloads 138 are illustrated when the pair of workloads 138 are connected or a connection attempt is blocked. The traffic flow graph 200 may be useful to enable a network administrator to better understand how the workloads 138 interoperate and may enable the administrator to create an improved segmentation policy or an improved strategy for automatically generating the segmentation policy. Furthermore, the segmentation server 120 can update the segmentation policy automatically based on the observed communications (e.g., to permit only communications that observed under normal operation so as to prevent anomalous communications that may be malicious).

An administrator may furthermore interact with the traffic flow graph 200 to refine the visual presentation according to specified criteria. For example, an administrator may select a line of the traffic flow graph and select to hide the line. Furthermore, the administrator may switch between different granularity levels to view the traffic flow graph 200 from different perspectives.

By providing visual indicators to identify connections associated with attack patterns, an administrator can more effectively manage the segmentation policy. For example, in the example traffic flow graph of FIG. 2, an administrator can easily see that a node $T^*_2$ is behaving in a potentially malicious way and that nodes $T_1$ and $T_4$ (which have permitted connections to the node $T^*_2$) may be compromised. An administrator may thus update the segmentation policy to block at least these connections $E^*_{12}$, $E^*_{25}$. Alternatively, the policy management server 120 may be configured to automatically update the segmentation policy to block at least these connections $E^*_{12}$, $E^*_{25}$ in response to the detection. In another embodiment, instead of immediately blocking the connections $E^*_{12}$, $E^*_{25}$, an enforcement module 132 associated with nodes $T_1$, $T_4$, and/or $T_5$ may configure a traffic filter to send traffic from the node $T^*_2$ to a deception service to enable the deception service to obtain additional information useful for determining whether or not node $T^*_2$ is acting maliciously.

Furthermore, in the example traffic flow graph of FIG. 2, an administrator can easily distinguish between blocked connection $B_{13}$ (which does not match an attack traffic pattern) and blocked connection $B^*_{42}$ (which does match an attack traffic pattern). An administrator may thus determine that the connection $B_{13}$ is non-malicious and may consider updating the segmentation policy to enable this connection.

In an embodiment, nodes of the traffic flow graph may instead correspond to external devices that are not part of the administrative domain 150 and do not necessarily have enforcement modules 132. Traffic flow data between with these external devices and workloads 138 may be obtained from enforcement modules 132 associated with the workloads 138.

Figure 3:
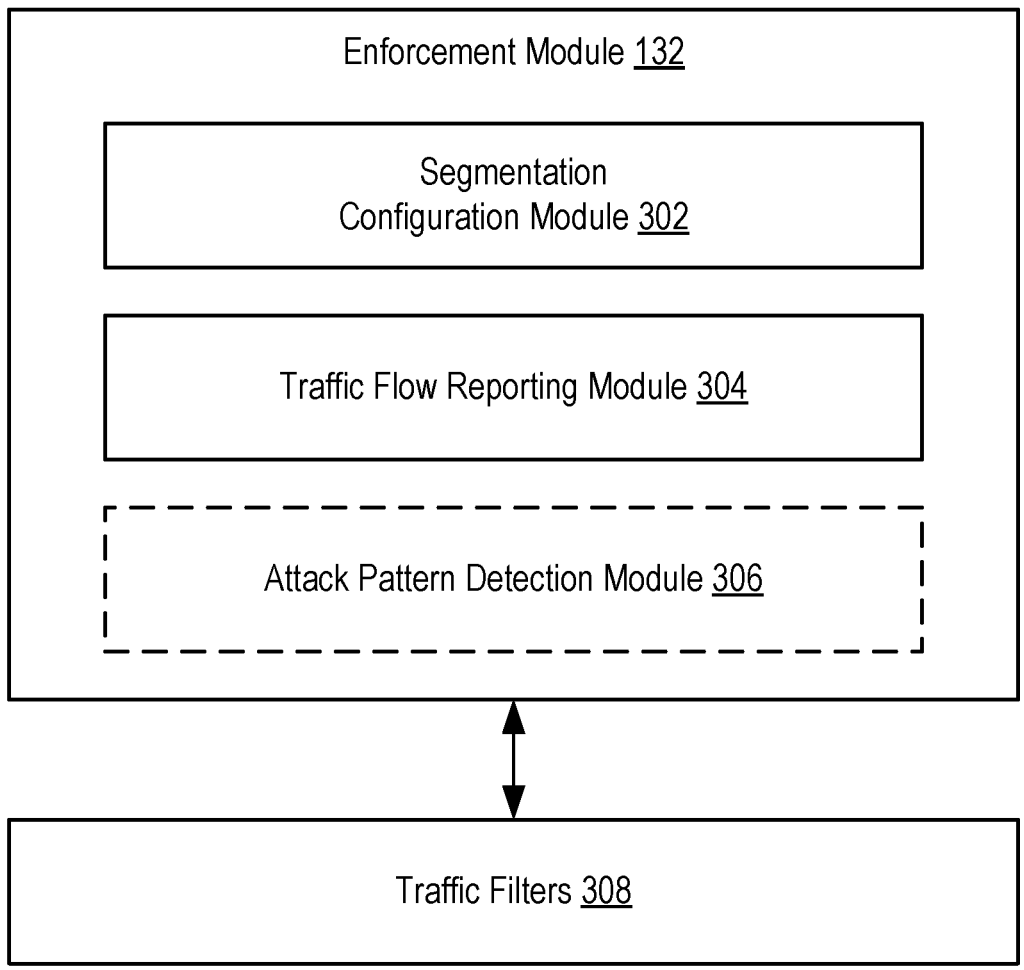
FIG. 3 is a block diagram illustrating an example embodiment of an enforcement module.

FIG. 3 illustrates an example embodiment of an enforcement module 132. The enforcement module 132 comprises a segmentation configuration module 302, a traffic reporting module 304, and optionally, an attack pattern detection module 306 that may each interact with one or more traffic filters 308. In alternative embodiments, the enforcement module 132 may include different or additional modules. The various components of the enforcement module 132 may be implemented as one or more processors and a non-transitory computer-readable storage medium that stores instructions executed by the one or more processors to carry out the functions attributed to the enforcement module 132 described herein.

The traffic filters 308 operates to enforce the segmentation policy with respect to a workload 138 executing on a host 130. To enforce the segmentation policy, the traffic filters 308 may apply a set of packet filtering rules that block or allow communications to a particular workload based on specific criteria associated with the communications such as the source and destination network addresses and ports, protocols associated with the communication, and a connection state. In an embodiment, the segmentation rules applied by the traffic filters 308 are generally permissive rules (e.g., a white list) that specify which specific communications are permitted. A default rule may cause the traffic filters 308 to block communications (e.g., drop packets) that do not match any of the permissive rules.

In an embodiment, the traffic filters 308 may comprise an operating system-level firewall such as a Linux kernel firewall based on iptables or Netfilter modules or a Windows firewall based on a Windows Filtering Platform. Furthermore, the traffic filters 308 may comprise an Internet Protocol security (IPsec) engine that controls encryption and decryption of packets.

The segmentation configuration module 302 receives management instructions from the policy management server 120 and translates the management instructions from a high level of abstraction to a low level of abstraction to configure the traffic filters 308 based on the segmentation policy. For example, for a given rule that permits communication between a workload 138 managed by the enforcement module 132 and a group of other workloads 138 having a specified label set, the segmentation configuration module 302 determines workload identifiers for each of the workloads 138 having the specified label set, and configures the traffic filters 308 to permit communications with the identified workloads 138 in accordance with any restrictions (e.g., ports and protocols) specified in the given rule.

The traffic reporting module 304 obtains traffic flow data from the traffic filters 308 indicating communications that pass through the filters 308 and communications that are blocked by the filters 308. For example, the traffic flow data may indicate the source network address and port, the destination network address and port, the protocol associated with the communication, whether the communication as allowed or blocked (and according to what rule), a connection state, or other identifying information. The traffic reporting module 304 may then report the traffic flow data to the policy management server 120. In an embodiment, the traffic reporting module 304 may aggregate or filter the traffic flow data prior to reporting to the policy management server 120. Alternatively, the traffic reporting module 304 may report the raw traffic flow data to the policy management server 120.

The attack pattern detection module 306 applies one or more detection rules to detect traffic patterns indicative of malicious behavior. The detection rules may be received from the policy management server 120 or an external rules database. In an embodiment, the attack pattern detection module 306 detects behavior associated with attack patterns such as DDoS attacks, UDP flood attacks, or ping flood attacks. For example, the attack pattern detection module 306 may detect if a workload 138 receives an abnormal number of UDP flows on a particular port (e.g, a VXLAN port) and the flow count exceeds a threshold count with packet sizes meeting a threshold byte size. In another embodiment, the attack pattern detection module 306 may detect when a particular source is scanning multiple ports of a workload 138. In further embodiment, the attack pattern detection module 306 may detect attack patterns based on factors other than network traffic, such as processes, files, and storage behaviors associated with a workload 138 or external host. In response to the attack pattern detection module 306 detecting an attack pattern, the attack pattern detection module 306 may label the traffic flow data with an indicator associated with the attack pattern that is transmitted to the policy management server 120 by the traffic reporting module 304.

In an alternative embodiment, the attack pattern detection module 306 may be omitted from the enforcement module 132. In this embodiment, the traffic reporting module 304 transmits the traffic flow data to the policy management server 120 and the determination of whether or not the traffic flow data matches an attack pattern is instead performed at the policy management server 120 as described below.

Figure 4:
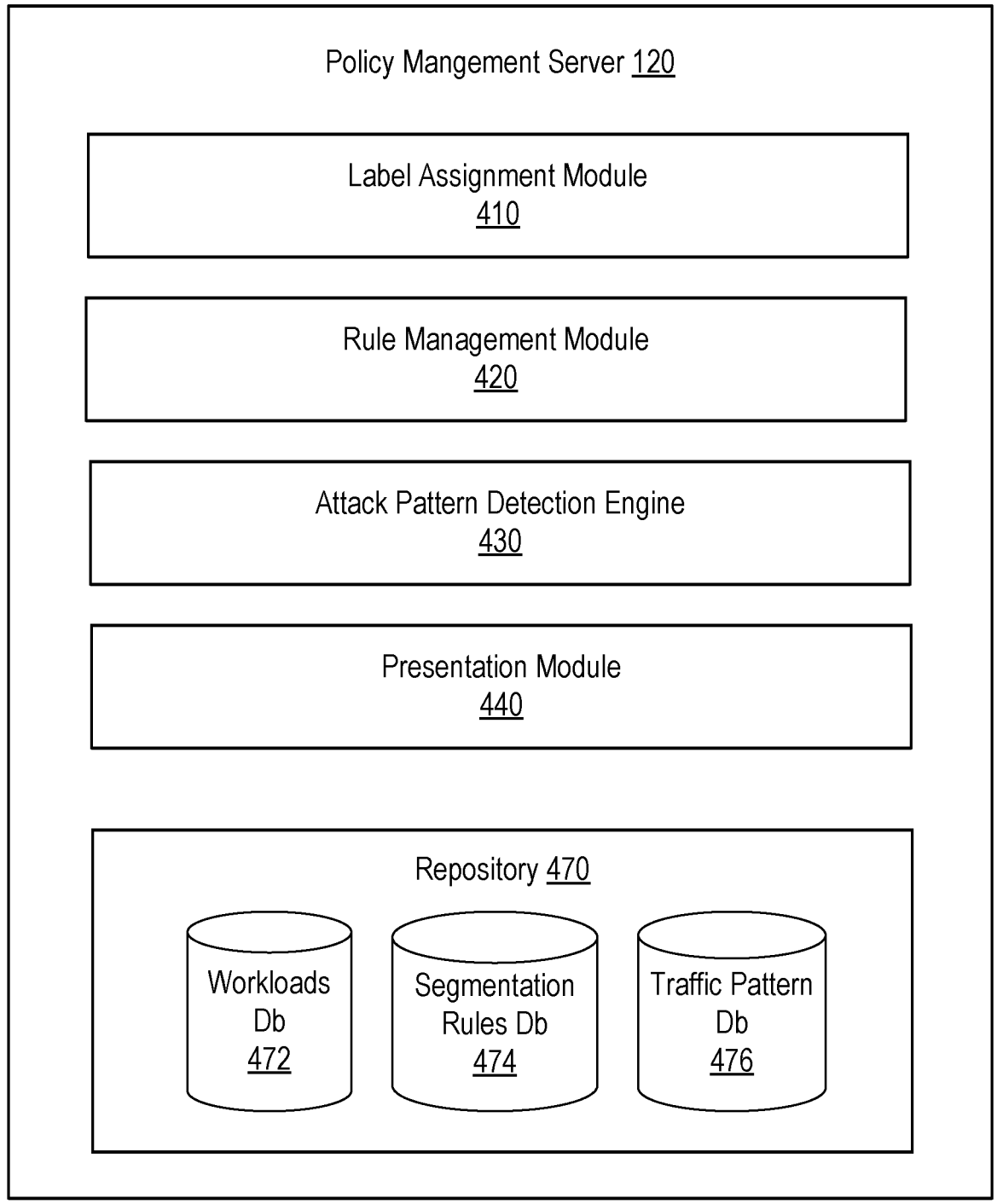
FIG. 4 is a block diagram illustrating an example embodiment of a policy management server.

FIG. 4 is a high-level block diagram of an embodiment of a policy management server 120. The policy management server 120 comprises a label assignment module 410, a segmentation policy management module 420, an attack pattern detection engine 430, a presentation module 430, and a repository 450. The repository 450 may comprise a workloads database 452 that stores associations between workloads 138 and their respective label sets, a segmentation rules database 454 that stores a segmentation policy as a set of rules, and an attack pattern database 456 that stores a plurality of reference attack patterns indicative of malicious behavior. In alternative embodiments, the policy management server 120 may include different or additional components. The various components of the policy management server 120 may be implemented as one or more processors and a non-transitory computer-readable storage medium that stores instructions executed by the one or more processors to carry out the functions attributed to the policy management server 120 described herein.

The label assignment module 410 facilitates assignment of labels to workloads 138. For example, the label assignment module 410 may assign labels based on a set of configurable label assignment rules that may be managed by an administrator via the administrative client 160. Alternatively, labels for individual workload 138 may be manually assigned by an administrator. Labels may be updated dynamically based on changing characteristics of workloads 138.

The segmentation policy management module 420 manages configuring and updating of a segmentation policy comprising a set of segmentation rules. The segmentation rules may be manually configured by a system administrator or may be generated automatically based on various predefined segmentation templates. Once configured, the segmentation policy management module 420 distributes the rules to enforcement modules 132 to enforce the segmentation policy. For example, the segmentation policy management module 420 determines which segmentation rules are relevant to different enforcement modules 132 depending on the labels of the workloads 138 associated with each enforcement module 132 and distributes only relevant rules to each enforcement module 132. Thus, different enforcement modules 132 may receive different subsets of the rules depending on which workloads 138 are associated with them. The segmentation policy management module 420 may dynamically update instructions sent to the enforcement modules 132 in response to changes in the segmentation policy, changes to the labels of workloads 138, changes to the applications executing on the workloads 138, or changes to application information associated with the applications.

The segmentation policy management module 420 may furthermore automatically update a segmentation policy based on observed traffic flow data. For example, the segmentation policy management module 420 may identify behavior indicative of malicious activity and may update the segmentation policy to take a remedial action against a malicious actor (e.g., removing the rule allowing communications to and from the identified malicious actor or otherwise quarantining the malicious actor). The segmentation policy management module 420 may furthermore generate a warning alert in response to an administrator requesting to enforce a rule that allows traffic associated with an identified attack pattern. The administrator can then determine whether or not to override the warning and enforce the rule or modify the rules.

The attack pattern detection engine 430 obtains traffic flow data from the enforcement modules 132 and detects traffic flows indicative of malicious behavior. For enforcement modules 132 that detect attack patterns locally with an attack pattern detection module 306, the attack pattern detection engine 430 may receive labels from the enforcement module 132 indicating traffic flows that match a detected traffic pattern. Alternatively, the attack pattern detection module 430 may receive unlabeled traffic flow data from the enforcement modules 132 and apply a set of detection rules to detect traffic pattern associated with malicious behavior. Upon detecting a traffic flow that matches an attack pattern, the attack pattern detection engine 430 may tag the traffic flow with metadata indicating the detected attack traffic pattern. The tagged traffic flow may be made accessible to an application for generating the visual representation of the traffic flow graph. Here, the visualization may include a visual indication identifying the traffic flow matching the traffic pattern (e.g., as illustrated in FIG. 2). Alternatively, or in addition, the traffic flow data including metadata tags identifying attack traffic may be made accessible to an application that generates, updates, or otherwise processes information relating to the segmentation policy. For example, the attack pattern detection engine 430 may provide an alert to an administrator client 160 indicative of the detected attack pattern. In another embodiment, after determining that the traffic flow data represents malicious behavior, the attack pattern detection engine 430 may redirect the traffic to a deception service that can identify and gather more information about the source of the malicious traffic.

The presentation module 440 interfaces with the administrative client 160 to present a user interface enabling an administrator to view a representation of the traffic flows and indications of detected attack patterns. For example, the presentation module 460 may generate a graphical interface representing all or a portion of the traffic flow graph with the workloads 138 illustrated as nodes and the traffic flows to and from the workload 138 illustrated as edges connecting relevant nodes. An administrator may similarly select an edge on the graph to view information about the corresponding traffic flow such as, for example, services associated with the traffic flow, ports and protocols associated with the traffic flow, or statistical information associated with the traffic flow. The visual representation of the traffic flow graph may provide visual indicators to indicate any workloads 138 and associated connections that have been identified as potentially malicious to enable an administrator to take remedial action. If actions are taken automatically by the segmentation policy management module 420 against a detected malicious actor, a representation of this action (e.g., blocked connections) may also be indicated in the traffic flow graph to enable an administrator to easily view the detection.

Figure 5:
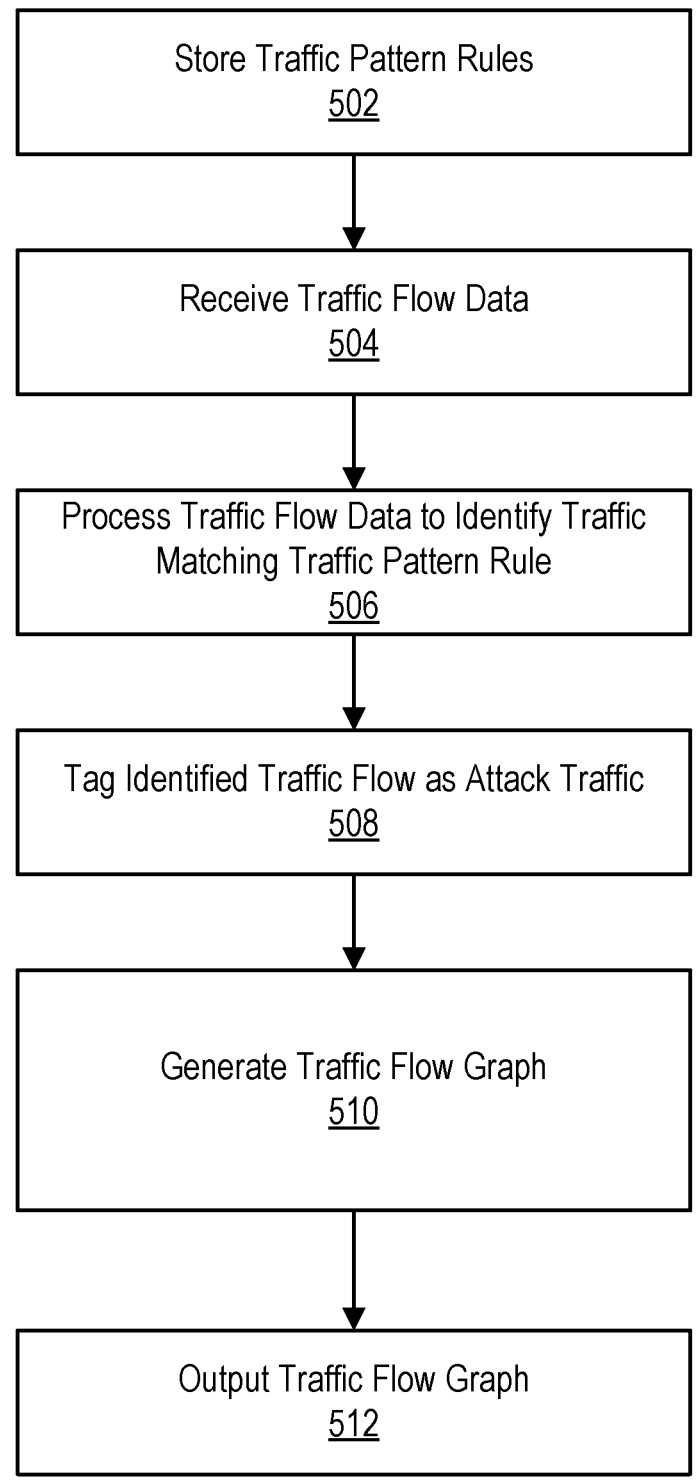
FIG. 5 is a flowchart illustrating an example embodiment of a process for detecting attack patterns in traffic flows.

FIG. 5 illustrates an embodiment of a process for detecting attack patterns in a segmented network environment. a policy management module 120 stores 502 a set of traffic pattern rules indicative of malicious behavior. The policy management module 120 receives 504 traffic flow data from one or more enforcement module 132. The policy management module 120 processes 506 the traffic flow data to identify traffic matching one or more traffic pattern rules. For example, the policy management module 120 may identify traffic flows that are labeled by an enforcement module 132 as matching a traffic pattern. Alternatively, the policy management module 120 may receive unlabeled traffic flow data and locally identify traffic flows matching an attack pattern. Metadata tags are stored 508 in association with connections between workloads or groups of workloads that include traffic flows matching an attack pattern. The policy management module 120 then generates 510 a traffic flow graph representing the connections. The policy management module 120 outputs 512 the traffic flow graph (or portions thereof). For example, the policy management module 120 may output a visual representation of the traffic flow graph for display (e.g., via an administrator client 160) to enable an administrator to take a remedial action. Alternatively, or in addition, the traffic flow graph, or portions thereof, may be outputted to an application that processes the traffic flow graph to generate, update, or make recommendations relating to the segmentation policy. Alternatively, or in addition, the policy management module 120 may automatically take a remedial action in response to detecting a traffic flow matching an attack pattern, such as updating the segmentation policy by removing rules allowing traffic to and from the source of the malicious traffic flows or otherwise quarantining the source.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

The invention claimed is:

1. A method for generating a traffic flow graph representing traffic in a segmented network environment, the method comprising:
   storing, by a policy management server, a plurality of traffic pattern rules for detecting traffic patterns indicative of malicious behavior;
   receiving, from a plurality of distributed enforcement modules, traffic flow data associated with a plurality of workloads managed by the plurality of distributed enforcement modules, the traffic flow data including blocked connection attempts and successful connections;
   processing, by the policy management server, the traffic flow data to identify a traffic flow between a first workload and a second workload that meets a matching traffic pattern rule selected from the plurality of traffic pattern rules;
   tagging the identified traffic flow with metadata tags indicating that the identified traffic flow corresponds to attack traffic;
   generating the traffic flow graph representing the traffic flow data and including the metadata tags for the identified traffic flow corresponding to the attack traffic; and
   providing the traffic flow graph to an application for generating or updating a segmentation policy.

2. The method of claim 1, wherein providing the traffic flow graph comprises:
   generating a visual representation of the traffic flow graph in which a first node represents the first workload, a second node represents the second workload, and an edge between the first node and the second node represents the traffic flow between the first workload and the second workload, and in which a visual indicator represents the tagged metadata indicating that the traffic flow corresponds to the attack traffic.

3. The method of claim 1, further comprising:
receiving, from an application on an administrator client, a request for information about the traffic flow; and
responsive to the request, providing the information about the traffic flow together with the tagged metadata indicating that the traffic flow corresponds to the attack traffic.

4. The method of claim 1, wherein processing the traffic flow data comprises:
transmitting the plurality of traffic pattern rules to the first workload;
receiving from the first workload, first traffic flow data corresponding to traffic between the first workload and the second workload; and
receiving an indication from the first workload that the first traffic flow data meets the matching traffic pattern rule.

5. The method of claim 1, wherein processing the traffic flow data comprises:
receiving from the first workload, first traffic flow data corresponding to traffic between the first workload and the second workload; and
applying the plurality of traffic pattern rules to identify that the first traffic flow data meets the matching traffic pattern rule.

6. The method of claim 1, further comprising:
automatically updating a segmentation policy in response to identifying that the traffic flow between the first workload and the second workload meets the matching traffic pattern rule.

7. The method of claim 6, wherein automatically updating the segmentation policy comprises:
detecting that the segmentation policy allows the traffic flow between the first workload and the second workload; and
updating the segmentation policy to block the traffic flow between the first workload and the second workload.

8. The method of claim 6, wherein automatically updating the segmentation policy comprises:
generating a filtering rule to cause the traffic flow from the second workload to the first workload to be redirected to a deception service; and
sending the filtering rule to an enforcement module managing the first workload.

9. The method of claim 1, wherein the connection between the first workload and the second workload is blocked under the segmentation policy, the method further comprising:
receiving a request to update the segmentation policy to enable the connection between the first workload and the second workload; and
generating an alert indicating that the identified traffic flow associated with the connection has been identified as having the attack pattern.

10. A non-transitory computer-readable storage medium storing instructions for generating a traffic flow graph representing traffic in a segmented network environment, the instructions when executed by one or more processors causing the one or more processors to perform steps including:
storing, by a policy management server, a plurality of traffic pattern rules for detecting traffic patterns indicative of malicious behavior;
receiving, from a plurality of distributed enforcement modules, traffic flow data associated with a plurality of workloads managed by the plurality of distributed enforcement modules, the traffic flow data including blocked connection attempts and successful connections;
processing, by the policy management server, the traffic flow data to identify a traffic flow between a first workload and a second workload that meets a matching traffic pattern rule selected from the plurality of traffic pattern rules;
tagging the identified traffic flow with metadata tags indicating that the identified traffic flow corresponds to attack traffic;
generating the traffic flow graph representing the traffic flow data and including the metadata tags for the identified traffic flow corresponding to the attack traffic; and
providing the traffic flow graph to an application for generating or updating a segmentation policy.

11. The non-transitory computer-readable storage medium of claim 10, wherein providing the traffic flow graph comprises:
generating a visual representation of the traffic flow graph in which a first node represents the first workload, a second node represents the second workload, and an edge between the first node and the second node represents the traffic flow between the first workload and the second workload, and in which a visual indicator represents the tagged metadata indicating that the traffic flow corresponds to the attack traffic.

12. The non-transitory computer-readable storage medium of claim 10, the instructions when executed further causing the processor to perform steps including:
receiving, from an application on an administrator client, a request for information about the traffic flow; and
responsive to the request, providing the information about the traffic flow together with the tagged metadata indicating that the traffic flow corresponds to the attack traffic.

13. The non-transitory computer-readable storage medium of claim 10, wherein processing the traffic flow data comprises:
transmitting the plurality of traffic pattern rules to the first workload;
receiving from the first workload, first traffic flow data corresponding to traffic between the first workload and the second workload; and
receiving an indication from the first workload that the first traffic flow data meets the matching traffic pattern rule.

14. The non-transitory computer-readable storage medium of claim 10, wherein processing the traffic flow data comprises:
receiving from the first workload, first traffic flow data corresponding to traffic between the first workload and the second workload; and
applying the plurality of traffic pattern rules to identify that the first traffic flow data meets the matching traffic pattern rule.

15. The non-transitory computer-readable storage medium of claim 10, the instructions when executed further causing the processor to perform steps including:
automatically updating a segmentation policy in response to identifying that the traffic flow between the first workload and the second workload meets the matching traffic pattern rule.

16. The non-transitory computer-readable storage medium of claim 15, wherein automatically updating the segmentation policy comprises:
  detecting that the segmentation policy allows the traffic flow between the first workload and the second workload; and
  updating the segmentation policy to block the traffic flow between the first workload and the second workload.

17. The non-transitory computer-readable storage medium of claim 15, wherein automatically updating the segmentation policy comprises:
  generating a filtering rule to cause the traffic flow from the second workload to the first workload to be redirected to a deception service; and
  sending the filtering rule to an enforcement module managing the first workload.

18. The non-transitory computer-readable storage medium of claim 10, wherein the connection between the first workload and the second workload is blocked under the segmentation policy, the instructions when executed by the processor further causing the processor to perform steps including:
  receiving a request to update the segmentation policy to enable the connection between the first workload and the second workload; and
  generating an alert indicating that the identified traffic flow associated with the connection has been identified as having the attack pattern.

19. A computer system comprising:
  one or more processors; and
  non-transitory computer-readable storage medium storing instructions for generating a traffic flow graph representing traffic in a segmented network environment, the instructions when executed by the one or more processors causing the one or more processors to perform steps including:
    storing, by a policy management server, a plurality of traffic pattern rules for detecting traffic patterns indicative of malicious behavior;
    receiving, from a plurality of distributed enforcement modules, traffic flow data associated with a plurality of workloads managed by the plurality of distributed enforcement modules, the traffic flow data including blocked connection attempts and successful connections;
    processing, by the policy management server, the traffic flow data to identify a traffic flow between a first workload and a second workload that meets a matching traffic pattern rule selected from the plurality of traffic pattern rules;
    tagging the identified traffic flow with metadata tags indicating that the identified traffic flow corresponds to attack traffic;
    generating the traffic flow graph representing the traffic flow data and including the metadata tags for the identified traffic flow corresponding to the attack traffic; and
    providing the traffic flow graph to an application for generating or updating a segmentation policy.

20. The computer system of claim 19, wherein providing the traffic flow graph comprises:
  generating a visual representation of the traffic flow graph in which a first node represents the first workload, a second node represents the second workload, and an edge between the first node and the second node represents the traffic flow between the first workload and the second workload, and in which a visual indicator represents the tagged metadata indicating that the traffic flow corresponds to the attack traffic.

* * * * *